Patented Aug. 13, 1946

2,405,838

UNITED STATES PATENT OFFICE 2,405,838

LIQUID SEPARATOR APPARATUS

Archibald Lawson, East Orange, N. J., and Charles M. Young, Newburgh, N. Y.

Application March 1, 1944, Serial No. 524,562

5 Claims. (Cl. 210—43)

This invention relates, generally, to improvements in apparatus for separating mixed liquids of different specific gravities; and the invention has reference, more particularly, to a novel apparatus for separating oil from boiler feed water, and especially for separating from water of condensation any oil suspended therein prior to return of such water as a feed supply to a steam generating boiler.

This invention has for an object to provide a novel separator apparatus for the purposes stated comprising a closed housing containing a plurality of spaced, substantially perpendicular, foraminous bodies or interstitial masses through which mixed liquids of different specific gravities, such as oil bearing water, delivered into the housing, is successively passed; said foraminous bodies or interstitial masses operating to retard movement of suspended oil particles, whereby to permit accumulative agglomeration thereof into relatively large oil bodies, while at the same time exercising a capillary effect upon the accumulated oil bodies, whereby the same tend to ascend through said foraminous bodies or interstitial masses and discharge therefrom to the upper portion of the housing interior, and thus, by reason of the lower specific gravity of the oil relative to that of the water, to collect and form a separated liquid oil mass within the upper interior of the housing, and above the water mass, so that the lower portion of the latter is free of oil.

The invention has for another object to provide a separator apparatus of the kind mentioned comprising a closed housing having means for admitting mixed liquids to be treated through the side thereof, and provided within the interior thereof, for extension between its bottom and top walls, with a plurality of spaced concentrically related foraminous bodies or interstitial masses which are surrounded by open spaces or wells; said housing having means for discharging water from the bottom interior portion thereof, and means communicating with said open spaces or wells for discharging oil from the top interior portion thereof.

Other objects of this invention, not at this time more particularly enumerated, will be understood from the following detailed description of the same.

Figure 1:
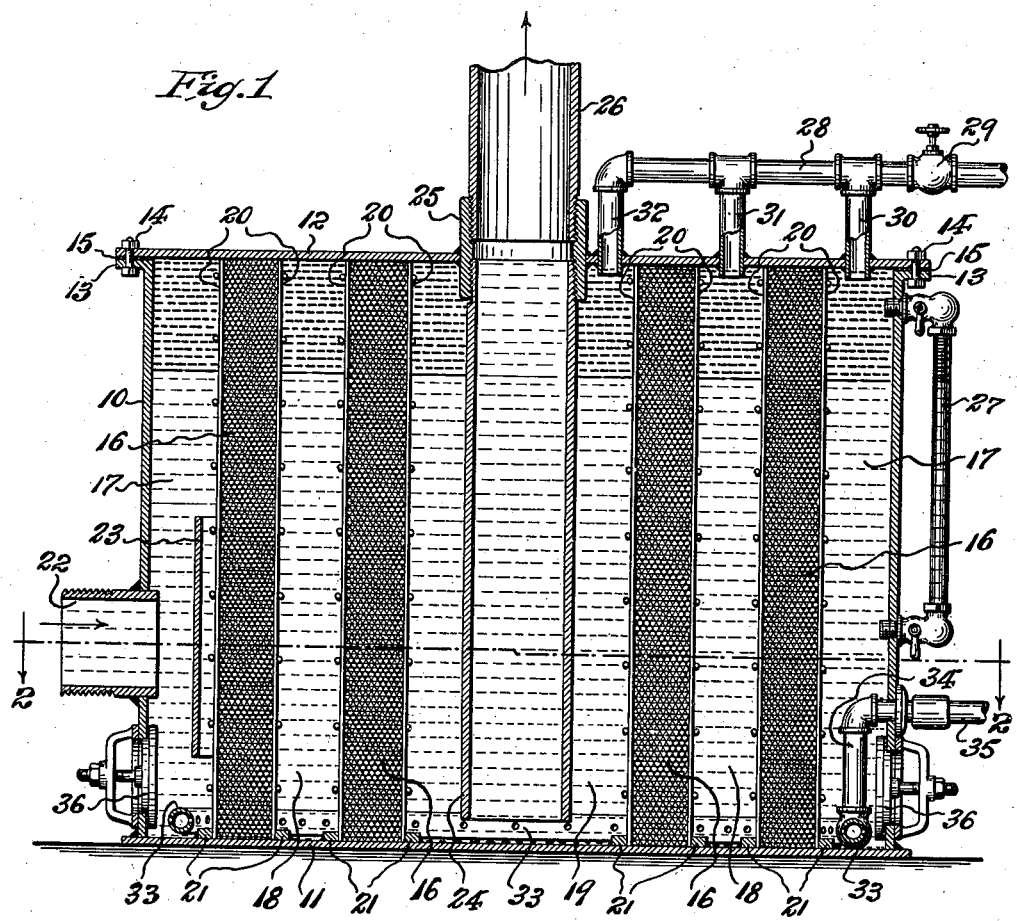
Figure 2:
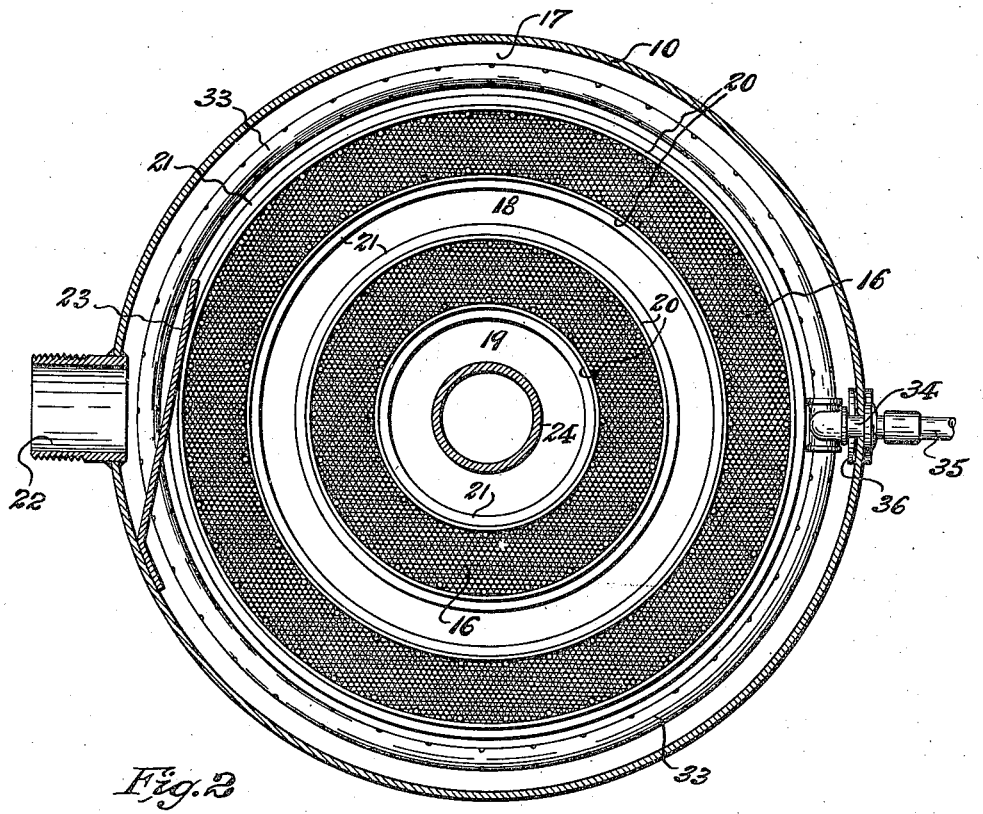

An illustrative embodiment of this invention is shown in the accompanying drawings, in which:

Fig. 1 is a vertical longitudinal sectional view of a separator apparatus made according to this invention; and Fig. 2 is a horizontal sectional view thereof, taken on line 2—2 in Fig. 1.

Similar characters of reference are employed in the hereinabove described views, to indicate corresponding parts.

Referring to the drawings, the reference character 10 indicates a housing, preferably of cylindrical form, which is closed by a bottom wall 11 and a top wall 12. The top wall 12 is preferably adapted to be removed from the housing 10, being normally secured to a top flange 13 of the latter by bolts 14, or other suitable fastening means. The joint between said top wall 12 and top flange 13 is sealed by an interposed gasket 15.

Arranged within the interior of the housing 10, to extend perpendicularly between its bottom and top walls 11 and 12, are annular foraminous bodies or interstitial masses 16 disposed in concentric spaced relation to each other and to the sides and axial center portion of said housing, whereby to provide an outer chamber or well 17, one or more intermediate chambers or wells 18, according to the number of spaced interstitial masses employed, and an inner or central chamber or well 19.

The foraminous bodies or interstitial masses 16 are each held in place by a pair of laterally spaced cylindrical perforate walls or grilles 20, which respectively bound inner and outer sides thereof; said walls or grilles being footed within spacer rings 21 which are suitably secured to the bottom wall of the housing 10, and which embrace the lower marginal portions of said walls or grilles, whereby to retain the same against lateral displacement from their supporting relation to the side faces of said foraminous bodies or interstitial masses 16.

The foraminous bodies or interstitial masses 16 may selectively comprise suitably aggregated material adapted to provide a liquid pervious porous wall mass of desired width or thickness. The material employed to provide the foraminous bodies or interstitial masses 16 should be of such character as to be non-compacting and of such constituent form as to provide substantially uniform porosity, whereby the body or mass is not only pervious to the liquid mixture to be treated, but also adapted to exercise a capillary effect especially upon one constituent of the mixture which is desired to be separated from the other constituent thereof.

A preferred form of material, which has been found to provide the desired characteristics above referred to, is formed from a knitted mesh fabric, preferably knitted from a metallic wire strand, which may be of round, ribbon-like or other suitable cross sectional shape. Such knitted mesh fabric may be folded upon itself, rolled, or otherwise arranged to form a body mass or masses built up by superposed contiguous layers thereof, and disposed between the keeper walls or grilles 20, so as to entirely fill the space therebetween from the bottom to the top of the housing interior. The knitted metallic mesh fabric, by reason of its uniformly and selectively sized interlinked loops, when superposed and built up into the required body mass, will provide a porous structure, the interstices of which will not only intercommunicate but will also be substantially uniformly distributed throughout the mass, whereby to both efficiently engage and accumulatively agglomerate oil particles, while at the same time exercising a capillary effect on oil bodies thus accumulated therein, whereby to cause the latter, under capillary effect, to tend to ascend through the interstitial mass, and, on escape therefrom, to collect as a water free oil body at and within the top portions of the housing interior.

Said housing 10 is provided with a liquid mixture intake 22, which enters the side thereof, preferably at a point adjacent to the lower portion or bottom of said housing. Suitably affixed within the housing interior, between the outermost foraminous body or interstitial mass 16 and said intake 22, is a laterally inclined or angular deflector baffle 23, which laterally deflects the ingoing liquid mixture so as to cause it to flow in a given direction around and through the outer chamber or well 17, whereby to uniformly distribute the same around the exterior of said outermost foraminous body or interstitial mass 16, and so as to equalize its hydrostatic pressure and cause it to uniformly penetrate the latter at all points, by eliminating direct impact of the liquid mixture at entering velocity against the portion of said outer foraminous body or interstitial mass 16 which is directly opposed to the intake 22.

Dependent from the top wall 12 of the housing 10 and axially disposed within the inner or central chamber or well 19 thereof, is a water discharge pipe 24, the lower intake end of which is disposed at the lower level of the housing interior and in adjacently spaced relation to the bottom wall 11 of said housing. Suitable provision is made, such as the union member 25, for coupling the upper end of said water discharge pipe 24 to a water delivery conduit 26, through which water may be drawn, by pump or other suitable means (not shown), for delivery to a place of use, such e. g. a boiler to which the clean water is to serve as feed supply.

Mounted on the exterior side of the housing 10, with its respective ends coupled in communication respectively with upper and lower levels of the housing interior, is a transparent liquid level gage or glass 27, to visibly indicate the separated bodies of water and oil, and to thus show the amount of accumulated separated oil contained within the upper interior of the housing during operation of the apparatus.

Means are provided for tapping off from the apparatus the separated oil accumulated therein. This means comprises an oil discharge pipe 28, provided with a suitably located control valve 29. Said oil discharge pipe is provided with tapping branches 30, 31 and 32, which enter through the top wall 12 of the housing 10 to respectively communicate with the upper portions of the respective chambers or wells 17, 18 and 19.

Means is provided for introducing at desired times into the interior of the housing 10 high pressure steam for the purpose of cleaning or washing out the foraminous separator bodies 16. This means comprises a perforate steam ejection ring 33 which is disposed on the bottom interior of the housing, exteriorly of the foraminous separator bodies. Connected with said steam ejection ring 33 is a steam delivery pipe 34 arranged to project exteriorly through the housing side, and to be suitably coupled to a steam supply line 35.

Suitably located in the side walls of the housing 10 are one or more clean-out manholes, normally closed by removable manhole covers 36 of conventional design.

In the operation of the apparatus, as used e. g. to separate oil from boiler feed water, the mixture of water and oil is delivered into the interior of the housing 10 through the intake 22, so as to be deflected by the deflector baffle 23 and thus caused to flow around the interior of the chamber or well 17 along the exterior side of the first foraminous body 16. The mixed liquids thereupon penetrate said first foraminous body 16, tending to move laterally therethrough so as to emerge from the inner side thereof and into an intermediate chamber or well 18. Upon gaining the interior of the foraminous body 16, the particles of oil suspended in the mixture are to a considerable extent retarded in movement by contact with the mesh material of said body, and are so slowed in movement as to allow time for oil particles to gather and coalesce, thus forming therefrom enlarged oil bodies. Owing to the porous or interstitial and wick-like form of the foraminous body 16, the same exercises a capillary effect upon the enlarged oil bodies, whereby the same tend to work upward through the body 16, and, assisted by the pressure of cross flowing liquid, tend to eventually escape outwardly therefrom into the adjacent intermediate chamber or well 18. Owing to the increased mass and lower specific gravity of the enlarged oil bodies, which make their way into the chamber or well 18, said bodies tend to rise to the top of the housing interior, wherein they further tend to accumulate and form a homogeneous oil mass on top of and separated from the underlying mass of water. This process is repeated as the liquid mixture flows laterally from the chamber or well 18 into the next adjacent foraminous body 16. In this connection, it will be understood that although for the purpose of illustration, but two such foraminous bodies 16 are shown in the accompanying drawings, the number of said foraminous bodies and intermediate chambers or wells is subject to wide variation and the same may comprise a series thereof of any desired number, accordingly as may be deemed expedient in any given case, or where, by reason of the character of a given liquid mixture to be treated, it may be desirable to subject the same to a multiple of the successive separation effects produced by the foraminous bodies 16 as described.

By reason of the differences in specific gravity of the oil and water constituents of the liquid mixture, tendency of the oil to rise through the water to the top thereof and thus to separate therefrom occurs in all the chambers or wells 17, 18 and 19. Due however to the expedition of the separating effect produced by the foraminous bodies 16, the water arriving in the lower part of the central or last chamber or well 19, will be substantially free from oil content, and consequently at this point provides a body of clean water which may be withdrawn from the interior of the apparatus through the discharge pipe 24.

As a body of separated oil accumulates at the top of the housing interior, its presence and amount will be visibly indicated by the gage 27. When the amount of accumulated oil warrants, the same may be tapped off from the several chambers or well 17, 18 and 19 through the oil discharge pipe 28 and its tapping branches 30, 31 and 32, by pump suction or other suitable means.

After a suitably prolonged period of use it is desirable to cleanse the interior of the housing and especially the foraminous bodies 16 thereof. This may be done by closing the intake 22 and the discharge outlets, leaving the liquid content within the interior of the housing, and thereupon discharging into the latter live steam, preferably under suitable pressure, from the steam ring 33. The thus introduced steam will churn the liquid and pass with the same through the foraminous bodies 16 with strong washing and cleansing effect.

Should it be desired to remove the foraminous bodies 16 for replacement, the top wall 12 of the housing may be removed, and said bodies and their supporting grilles may thereupon be removed and replaced. The bottom interior of the housing may be flushed out by removing the manhole covers 36 to provide ingress and egress to flushing fluid.

While we have described the apparatus of this invention when used as a separator for removing oil from boiler feed water, it will be obvious that the same may be employed for separating treatment of any other kind of liquid mixtures wherein the constituents are of different specific gravities and are not solubly miscible.

We are aware that various changes could be made in the above described constructions, and that widely different embodiments of this invention could be made without departing from the scope thereof as defined by the herefollowing claims. It is therefore intended that all matter contained in the foregoing description and shown in the accompanying drawings shall be interpreted as illustrative and not in a limiting sense.

We claim:

1. Apparatus for separating the constituents of a liquid mixture, said constituents of which are of different specific gravities, comprising a closed housing having mixture intake means entering the side thereof adjacent to its bottom, a series of spaced concentric, liquid pervious, foraminous body masses of substantial thickness extending perpendicularly within the housing interior between the top and bottom thereof adapted to subdivide said housing interior into successive perpendicular chambers, whereby the liquid mixture entering said housing through said intake means may pass from one chamber laterally through a foraminous body mass into a succeeding chamber for the purposes described, each foraminous body mass comprising superposed layers of knitted metallic mesh adapted to exercise a capillary effect upon the constituent of the liquid mixture which is of lesser specific gravity, laterally spaced grilles bounding opposite sides of each said foraminous body mass to retain the same in place, means in communication with the bottom interior of said housing for drawing off a separated constituent of the liquid mixture which is of greater specific gravity, and means in communication with the top interior of said housing for drawing off a separated constituent of said liquid mixture which is of lesser specific gravity.

2. Apparatus for separating the constituents of a liquid mixture, said constituents of which are of different specific gravities, comprising a closed housing having mixture intake means entering the side thereof adjacent to its bottom, a series of concentrically spaced, liquid pervious, foraminous body masses of substantial thickness extending perpendicularly through the interior of said housing from the bottom to the top thereof, whereby to subdivide said housing interior into successive perpendicular chambers, whereby the liquid mixture entering said housing through said intake means may pass inwardly from one chamber laterally through a foraminous body mass into a succeeding chamber for the purposes described, said foraminous body masses being adapted to exercise a capillary effect upon the constituent of the liquid mixture which is of lesser specific gravity, means in communication with the bottom portion of the innermost chamber for drawing off a separated constituent of the liquid mixture which is of greater specific gravity, and means in communication with the upper portions of all chambers for drawing off a separated constituent of said liquid mixture which is of lesser specific gravity.

3. Apparatus for separating the constituents of a liquid mixture, said constituents of which are of different specific gravities, comprising a closed housing having mixture intake means entering the side thereof adjacent to its bottom, a series of concentrically spaced, liquid pervious, foraminous body masses of substantial thickness extending perpendicularly through the interior of said housing from the bottom to the top thereof and adapted to subdivide said housing interior into successive perpendicular chambers, whereby the liquid mixture entering said housing through said intake means may pass from one chamber laterally through a foraminous body mass into a succeeding chamber for the purposes described, each foraminous body mass comprising superposed layers of knitted metallic mesh adapted to exercise a capillary effect upon the constituent of the liquid mixture which is of lesser specific gravity, laterally spaced grilles bounding opposite sides of each said foraminous body mass to retain the same in place, means in communication with the bottom portion of the last chamber for drawing off a separated constituent of the liquid mixture which is of greater specific gravity, and means in communication with the upper portions of all chambers for drawing off a separated constituent of said liquid mixture which is of lesser specific gravity.

4. Apparatus for separating the constituents of a liquid mixture, said constituents of which are of different specific gravities, comprising a closed cylindrical housing having mixture intake means entering the side thereof adjacent to its bottom, a plurality of liquid pervious cylindrical foraminous bodies of substantial thickness extending perpendicularly through the interior of said housing from bottom to top thereof and concentrically spaced relative to each other and to the side wall of said housing, whereby to divide said housing interior into successive perpendicular chambers comprising outer, inner and intermediate chamber space, a deflector baffle extending angularly from the housing side wall so as to be interposed between the intake means and the outer face of the outermost foraminous body, whereby the liquid mixture entering the housing through said intake means may pass from the outer chamber space to the inner chamber space laterally and successively through said foraminous bodies and intermediate chamber space for the purposes described, said foraminous bodies each comprising superposed layers of knitted metallic mesh adapted to exercise a capillary effect upon the constituent of the liquid mixture which is of lesser specific gravity, laterally spaced grilles bounding opposite sides of each foraminous body to retain the same in place, means in communication with the bottom portion of said inner chamber space for drawing off a separated constituent of the liquid mixture which is of greater specific gravity, and means in communication with the upper portions of all chamber spaces for drawing off a separated constituent of said liquid mixture which is of lesser specific gravity.

5. In apparatus of the kind defined in claim 4, including a steam ejector ring mounted within the bottom interior portion of said housing.

ARCHIBALD LAWSON.
CHARLES M. YOUNG.